Aug. 17, 1954 W. W. MOE 2,686,870
DEMODULATION CIRCUIT
Filed Aug. 13, 1949
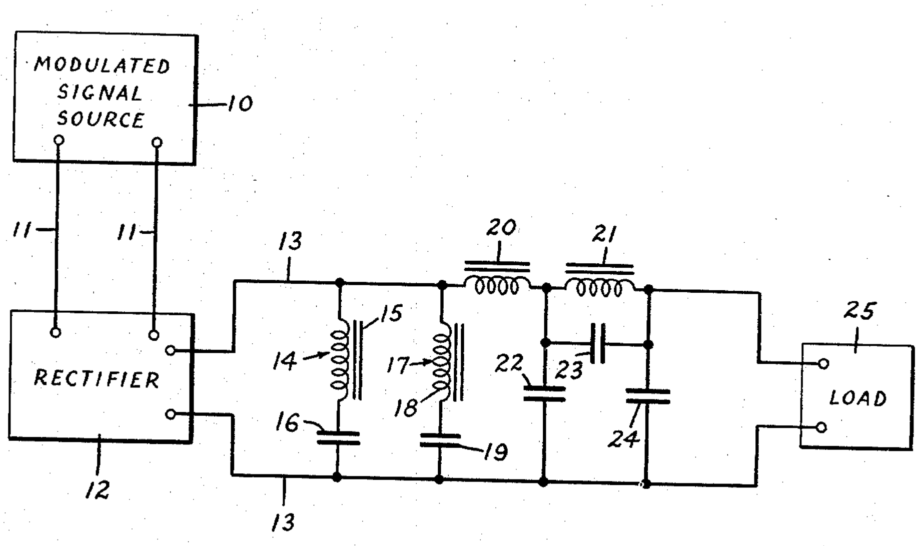
INVENTOR.
WILLIAM WEST MOE
BY
Campbell, Brumbaugh, Free & Graves
HIS ATTORNEYS.

Patented Aug. 17, 1954

2,686,870

UNITED STATES PATENT OFFICE 2,686,870

DEMODULATION CIRCUIT

William West Moe, Stratford, Conn., assignor to Time, Incorporated, New York, N. Y., a corporation of New York Application August 13, 1949, Serial No. 110,219

6 Claims. (Cl. 250—21)

This invention relates to filter networks and more specifically to a new and improved filter network which is of special utility for filtering out components of a carrier frequency from a rectified modulated carrier, where there are modulation components whose frequency is near the carrier frequency.

In certain applications of electronic circuits, the necessity sometimes arises for effective filtering of carrier frequency components from a rectified modulated carrier, where the modulation impressed upon the carrier includes components of frequencies near the carrier frequency. Thus, in electronic color correction circuits a carrier frequency of say 7,680 cycles may be modulated by picture components in the range from zero to 1,000 cycles. The carrier is subsequently subjected to rectification and components of unwanted frequencies are filtered out leaving a signal varying in accordance with the modulation. In order to obtain a signal that accurately represents the modulation impressed on the carrier, the rectified carrier should be fed into a large capacitor so that a D. C. voltage equal to the peak A. C. voltage would be produced. If this is done, however, some of the higher modulation components will be lost through the low impedance shunt path formed by the condenser.

It is an object of the invention, accordingly, to provide a new and improved filter circuit which is capable of producing a D. C. voltage substantially equal to the peak A. C. voltage in a system of this type without losing higher modulation components.

Another object of the invention is to provide a new and improved filter circuit of the above character in which the D. C. signal output will follow rapid variations in the A. C. modulated carrier.

According to the invention, a filter circuit is provided in which series resonant circuits tuned to the more important lower frequency even harmonics are employed for eliminating the carrier and its harmonics. If full wave rectification is employed, it has been found that two series resonant circuits, one tuned to twice the carrier frequency and one tuned to four times the carrier frequency, are sufficient to raise the D. C. output voltage to within a few per cent of the peak A. C. input voltage. The effect of the tuned circuits at modulation frequencies is essentially the same as that of a very small shunt capacity which forms the first capacitance of the low pass filter. Accordingly, the D. C. output will follow rapid variations in the A. C. modulated carrier without material loss of the higher modulation components that are developed.

The invention may be better understood from the following detailed description of a representative embodiment thereof, taken in conjunction with the single accompanying drawing.

Referring now to the single figure, a modulated signal source is shown at 10 which provides an output comprising a carrier of say 7,680 cycles per second modulated by signals in the frequency range of say zero to 1,000 cycles per second. The modulated signal output from the source 10 is supplied through the conductors 11 to a conventional full wave rectifier 12, the output from which includes modulation components as well as the carrier and its harmonics.

As indicated, in order to obtain a D. C. voltage substantially equal to the peak A. C. voltage, the output from the full wave rectifier 12 should be fed to a large capacitor. This cannot be done, however, because a large capacitor would act as a low impedance shunt to the higher modulation components which are developed. Since the A. C. components in the output voltage from the full wave rectifier 12 are predominantly lower even harmonics of the 7,680 cycles per second carrier frequency, the effect of a large capacitor, so far as the A. C. harmonics are concerned, is produced according to the invention by using series resonant electrical circuits tuned to the important lower frequency even harmonics. It has been found that two series resonant circuits, one tuned to double the carrier frequency, and one tuned to four times the carrier frequency are sufficient to produce the desired D. C. voltage output.

Thus, the output from the full wave rectifier 12 is fed through the conductors 13 to a first series resonant circuit 14 comprising an inductance 15, and a capacitance 16, which is tuned to twice the carrier frequency. Connected in parallel with the series resonant circuit 14 is a second series resonant circuit 17 including an inductance 18 and a capacitance 19, which is tuned to four times the carrier frequency. The output appearing across the parallel connected tuned circuits 14 and 17 is supplied to a conventional low pass filter comprising the series inductances 20 and 21 and the capacitances 22, 23 and 24, the final filtered output being supplied to a load 25.

For a carrier frequency of 7,680 cycles containing modulation components in the frequency range of zero to 1,000 cycles, the desired filtering effect can be secured with the following typical values for the several circuit components:

| | |
|---|---|
| Inductance **15** | .25 henry, approximately. |
| Inductance **18** | .15 henry, approximately. |
| Inductance **20** | 10 henries. |
| Inductance **21** | 10 henries. |
| Capacitance **16** | 350 mmf. |
| Capacitance **19** | 190 mmf. |
| Capacitance **22** | .001 mfd. |
| Capacitance **23** | 75 mmf. |
| Capacitance **24** | 500 mmf. |

It will be understood from the foregoing that the invention provides a highly effective filter circuit which is capable of producing a D. C. signal that follows rapid variations in the A. C. voltage without any appreciable loss of the higher frequency modulation components which are developed. At modulation frequencies, the tuned circuits used in accordance with the invention behave very much like a small shunt capacity which forms the first capacitance of the succeeding low pass filter which is employed to pass modulation components and to eliminate the carrier and its harmonics.

The illustrative carrier and modulation frequencies and the typical values for the several circuit components given above are intended merely to be illustrative. Obviously, they can be varied over a wide range depending upon the results desired. Also, other modifications may be made in the circuit within the spirit of the invention, as will be apparent to those skilled in the art. The specific embodiment described above and illustrated in the drawings is not to be regarded, therefore, as restricting in any way the scope of the appended claims.

I claim:

1. A demodulation circuit for passing modulation components in a modulated carrier having modulation components near the carrier frequency and for eliminating the carrier and unwanted harmonics thereof, comprising, means for rectifying said modulated carrier to provide the rectified modulated carrier as an output, a series resonant circuit connected to receive said rectified modulated carrier for demodulation thereof and tuned to the second harmonic of said carrier, and series inductance-shunt capacitance filter means having an input connected across said series resonant circuit, said filter means including a series inductance branch interposed between said series resonant circuit and any shunt capacitance of said filter means, said filter means being tuned to pass modulation components to an output of said filter means and to eliminate the carrier and unwanted harmonics thereof.

2. A demodulation circuit for passing modulation components in a modulated carrier having modulation components near the carrier frequency and for eliminating the carrier and unwanted harmonics thereof, comprising, means for rectifying said modulated carrier to provide the rectified modulated carrier as an output, a first series resonant circuit connected to receive said rectified modulated carrier and tuned to the second harmonic of said carrier, a second series resonant circuit connected directly in shunt with said first resonant circuit and tuned to a higher harmonic of said carrier, said series resonant circuits being adapted cooperatively to effect demodulation of said rectified modulated carrier, and series inductance-shunt capacitance filter means having an input connected across said second series resonant circuit, said filter means including a series inductance branch interposed between said series resonant circuits and any shunt capacitances of said filter means, said filter means being tuned to pass modulation components to an output of said filter means and to eliminate the carrier and harmonics thereof.

3. A demodulation circuit for passing modulation components in a modulated carrier having modulation components near the carrier frequency and for eliminating the carrier and other unwanted harmonics thereof, comprising, means for full-wave rectifying said modulated carrier to provide the rectified modulated carrier as an output a first series resonant circuit connected to receive said rectified modulated carrier and tuned to the second harmonic thereof, a second series resonant circuit connected directly in shunt with said first resonant circuit and tuned to the fourth harmonic of said carrier said series resonant circuits being adapted cooperatively to effect demodulation of said rectified modulated carrier, and two stage, series inductance-shunt capacitance filter means having an input connected across said second resonant circuit said filter means including a series inductance branch interposed between said series resonant circuits and any shunt capacitances of said filter means, said filter means being tuned to pass modulation components to an output of said filter means and to eliminate the carrier and unwanted harmonics thereof.

4. Demodulation apparatus for demodulating a modulated carrier signal where the modulation impressed upon the carrier includes components of frequencies near the carrier frequency, comprising, means for rectifying said modulated carrier to provide the rectified modulated carrier as an output inductance input filter means having an output and including series inductance means and shunt capacitance means in a mutual network relation wherein at least some of said series inductance means is interposed between said shunt capacitance means and said input, said filter means being designed for attenuation of carrier signal components in said rectified signal when passing through said filter means to said output without appreciable attenuation of modulation components thereof, and first and second series resonant circuits adapted to receive said rectified modulated carrier and both connected directly in shunt with the input of said filter means, said first and second resonant circuits being tuned, respectively, to the second and another major harmonic of substantial magnitude which are present in said rectified carrier signal for demodulation of said rectified modulated carrier signal, whereby the form of the filtered output voltage from the apparatus will be substantially identical with the modulation envelope of the original carrier signal.

5. Demodulation apparatus as defined in claim 4 for demodulating said modulated carrier signal in which said first and second series resonant circuits are tuned to the second and fourth harmonics, respectively, of the carrier frequency.

6. A demodulation circuit for demodulating a modulated carrier having modulation components near the carrier frequency comprising, means for rectifying said modulated carrier to provide the rectified modulated carrier as an output, a pair of series resonant circuits connected directly in parallel to receive the rectified modulated carrier to be filtered, and tuned to the second and another higher major harmonic of the carrier frequency for demodulation of the rectified modulated carrier, and series inductance-shunt capacitance filter means having an input connected across said resonant circuits, said filter means including a series inductance branch interposed between said series resonant circuits and any shunt capacitance of said filter means, said filter means being tuned to pass some modulation components to an output of said filter means and to reject others.

References Cited in the file of this patent

UNITED STATES PATENTS

| Number | Name | Date |
|---|---|---|
| 1,800,996 | Gerth | Apr. 14, 1931 |
| 1,920,948 | Crouse | Aug. 1, 1933 |
| 1,968,259 | Posthumus et al. | July 31, 1934 |
| 1,969,902 | Roberts | Aug. 14, 1934 |
| 2,012,291 | Tuttle | Aug. 27, 1935 |
| 2,015,534 | Rose | Sept. 24, 1935 |
| 2,109,561 | Wright | Mar. 1, 1938 |
| 2,272,385 | Salzberg | Feb. 10, 1942 |
| 2,608,648 | Magnuski | Aug. 26, 1952 |